Sept. 1, 1959 E. T. LESSIG 2,902,073
TIRE CONSTRUCTION
Filed March 25, 1954
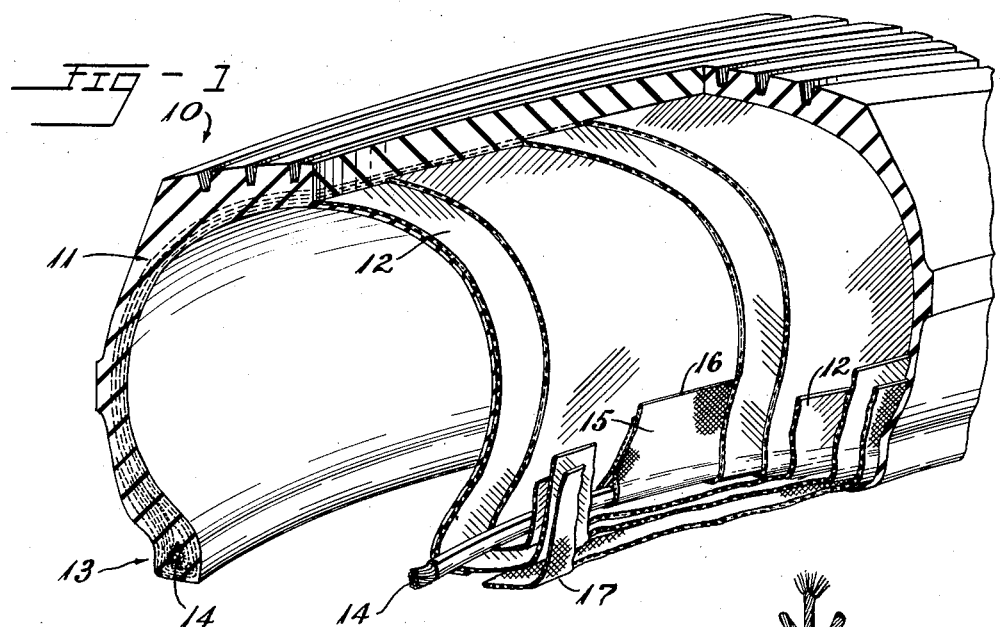
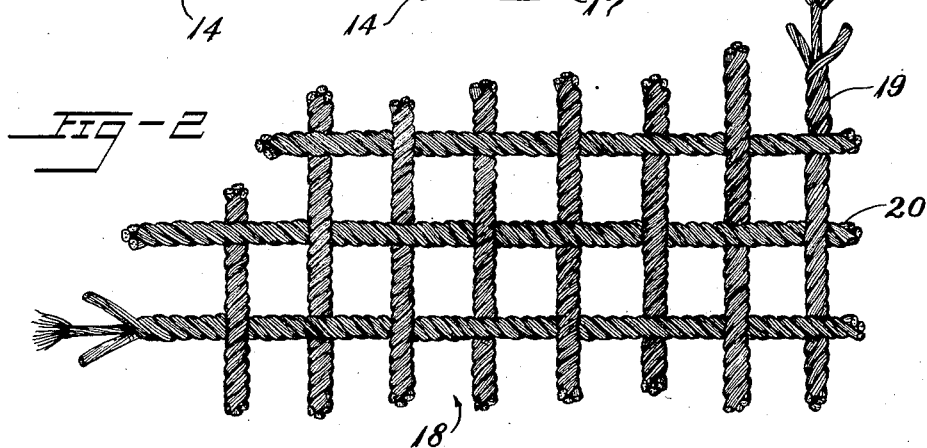
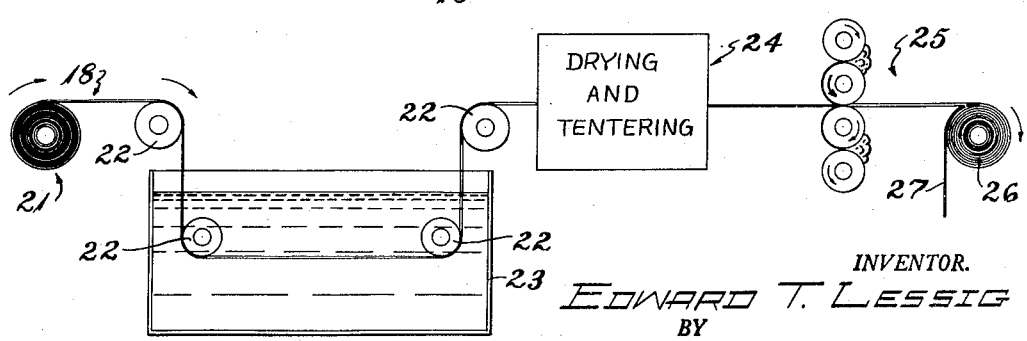
INVENTOR.
EDWARD T. LESSIG
BY
W. A. Shira, Jr.
ATTY United States Patent Office 2,902,073
Patented Sept. 1, 1959

2,902,073

TIRE CONSTRUCTION

Edward T. Lessig, Cuyahoga Falls, Ohio, assignor to The B. F. Goodrich Company, New York, N.Y., a corporation of New York Application March 25, 1954, Serial No. 418,604

6 Claims. (Cl. 152—362)

This invention relates to pneumatic tire constructions and, more particularly, to tires having improved chafing and/or flipper strips.

Conventional tire constructions at the present time employ a carcass of rubber, or other elastomer, and cords with the wheel rim engaging portions or beads reinforced by circumferentially extending cores of wire or other relatively rigid material. These bead cores are covered by strips of fabric known as "flipper strips" that extend upwardly into the sidewalls of the tire and stiffen the latter. Over the exterior of the tire carcass in the regions of the beads and extending at least partially about the latter are chafing or finishing strips which are intended to resist abrasion of the tire by the rim flanges on which the tire is mounted. These flipper and chafing or finishing strips are generally formed of closely woven fabric, the cords of which have a low twist. Consequently, the sidewalls of the tire, especially in the regions of the beads, have been quite rigid.

Modern emphasis upon easy or soft riding of vehicles, however, has resulted in tire constructions wherein there is increased flexing of the tire sidewalls. This flexing in tire constructions employing rigid bead regions is not uniformly distributed throughout the entire sidewalls of the tire with the result that excessive flexing stresses are developed. Moreover, the prior constructions have had low flex resistant characteristics so that sidewall cracks or breaks frequently develop. In an effort to overcome this defect, it has heretofore been proposed to substitute a weftless fabric for the woven chafer and flipper fabric. While this does reduce the rigidity of the bead region of the sidewall, there is a resulting serious sacrifice in strength of the tire in this region especially in its ability to resist stresses directed at right angles to the length of the cords in such weftless fabric. Moreover, the rubber or other elastomer between the cords is readily abraded or scraped longitudinally of the cords by the chafing action of the rim flange since there are no cross or weft cords to prevent such displacement. Hence, the cords of the chafer or finishing strips are soon exposed and are themselves worn or damaged so that they are not available to protect the ply cords and hence the tire rapidly deteriorates.

An object of this invention is to provide an improved pneumatic tire construction wherein rigidity in the bead regions of the tire is reduced and the flex resistance thereof increased so that the formation and/or growth of sidewall cracks and breaks are materially reduced.

Another object of the invention is to provide an improved pneumatic tire construction wherein the stresses in the sidewalls, due to deflections of the tire, extend more uniformly from the shoulder to the base of the tire thereby reducing excessive localized stresses adjacent the beads.

A further object of the invention is to provide an improved fabric for the chafer and/or flipper strips in a pneumatic tire characterized by the flex resistance of the fabric being increased and the stiffness thereof reduced so that the bead regions of a tire in which the fabric is incorporated are less rigid and can tolerate greater shearing stresses than in prior constructions.

A more specific object of the invention is to provide an improved woven fabric for the chafer and/or flipper strips of a pneumatic tire as defined in the preceding paragraph wherein the number of turns per inch of the cords in the fabric and the spaces between the cords are increased thereby providing greater flex resistance and better adhesion of the fabric to the rubber or other elastomer of the tire in which the fabric is incorporated.

An additional object of the invention is to provide an improved fabric for the chafer and/or flipper strips of a pneumatic tire wherein the cords of the fabric are formed of twisted continuous filament synthetic fibers with the longitudinally extending interstices between the individual fibers substantially filled by a composition containing polymerized molecules having both polar groups and curing groups so that bonding of the fibers to rubber of the tire is facilitated and passage of air along and through the cords is prevented.

A still more specific object of the invention is to provide an improved fabric for the chafer and/or flipper strips of a pneumatic vehicle tire as defined in the preceding paragraph wherein the said fabric has intersecting warp and weft cords having a twist greater than six turns to the inch and with the spaces between the cords constituting from 10% to 30% of the total area of the fabric.

Other and further objects and advantages of the invention will be apparent to those skilled in the art to which it pertains from the following detailed description of the presently preferred embodiment thereof, described with reference to the accompanying drawing forming a part of this application and in which:

Fig. 1 is a fragmentary perspective view of a portion of a pneumatic tire embodying the invention with parts of the tire being broken away at different locations to more clearly reveal the construction;

Fig. 2 is an enlarged and exaggerated plan view of a portion of the improved fabric employed in the chafer and/or flipper strips of the tire illustrated in Fig. 1; and Fig. 3 is a schematic illustration of the manner in which the fabric shown in Fig. 2 is treated prior to incorporation into a tire.

The pneumatic vehicle tire illustrated in Fig. 1 as incorporating the invention includes a tread portion 10 surrounding an inner carcass 11 of resilient rubber or other elastomeric material and reinforcing filaments, such as the cord plies 12, the inner periphery of the tire being defined by the spaced bead portions 13. These bead portions include the usual cores 14, here shown as a plurality of circumferentially extending wires. Each bead core 14 has a flipper strip 15 disposed thereabout with the ends of the strip 15 extending unequal distances radially of the sidewall of the tire so that at least one edge, such as 16, of the strip is disposed outwardly of the location at which the periphery of the rim flange of the wheel, on which the tire is mounted, engages the bead region of the tire. The ends of the reinforcing cord plies 12 extend around the bead cores and flipper strips as is well known in the tire building art and one or more chafing or finishing strips 17 are provided externally of the plies. These chafing or finishing strips extend beneath the bead regions 13 to protect the tire from rim chafing due to flexing and other relative movement between the tire and the rim on which it is mounted.

In accordance with this invention, the chafing or finishing strips 17 and/or the flipper strips 15 are formed of an open weave fabric 18 having high twist warp cords 19 and weft cords 20 intersecting each other at an angle of substantially 90°, see Fig. 2. The fabric 18 is of the open weave type. That is, the cords of the fabric 18 are spaced from each other, as shown to an exaggerated extent in Fig. 2, so that the area of the spaces between the cords represents in the order of 10% to 30% of the total area of the fabric; this open weave being in contrast to the tightly woven fabrics commonly employed for chafer and flipper strips.

The individual cords 19 and 20 comprising the fabric 18 not only are spaced greater distances than in conventional chafer or flipper fabric but, in addition, the cords have a higher than normal twist for cords in fabric of this nature. Thus, in contrast to twists in the order of three per inch for conventional chafer or flipper fabrics, the improved fabric employs cord twists in excess of six turns per inch, the upper limit of the number of twists being determined by the desired ultimate tensile strength of the cords. By way of example, but without limitation thereto, the cords comprising the fabric 18 may be rayon, nylon, or other synthetic fibers and, preferably, the cords are formed from bundles of continuous filaments twisted together to form strands or plies which, in turn, are twisted to form the cords. The twist imparted to the individual strands is preferably not of a high order.

One suitable fabric having the above mentioned characteristics comprises cords of nylon, the single yarns of which are 210 denier with a twist of ¾ turn to the inch, three such yarns being cabled to form cords having seven turns to the inch, and the cords then woven into a fabric having twenty-seven of the cords per inch in each direction. Another suitable fabric comprises cords the single yarns of which are 420 denier having a twist of ¾ turn to the inch with two such yarns cabled with a twist of seven turns to the inch and with the number of cords per inch such that the open spaces comprise 10% to 30% of the total area of the fabric. As a further example, 840 denier yarn may be twisted to more than six turns per inch and employed as a single yarn cord for the warp and weft cords in a fabric having the aforementioned open weave. These specific examples are, of course, only illustrative of the weights of yarns and twists thereof which may be utilized, and it will be understood that the invention is not limited thereto.

The aforementioned high twist imparted to the cords 19 and 20, forming the fabric 18, provides important improvements in the characteristics of the tire in which fabric of this nature is employed for finishing and/or flipper strips. Thus, the flex resistance of such tires is greatly increased and the flexing properties of the sidewalls of the tire are more nearly uniformly distributed from the shoulder to the bead regions so that higher flexing can now be tolerated in the bead regions of the tire. As a result, sidewall cracks and breaks due to flexing in excess of the flex resistances of the sidewalls are eliminated. Moreover, the sidewalls of a tire can be made less rigid thus providing a softer or easier ride in a vehicle equipped with such tires.

The open weave of the fabric 18 is also an important characteristic thereof because it permits greater "strike through" with respect to the rubber or other elastomer employed in the tire so that the cord is uniformly and integrally united in the carcass. This prevents separations in the carcass and abrasion of the warp and weft cords inter se or with the cords of the reinforcing plies 12. Moreover, by providing in the order of 10% to 30% of the area of the fabric in the form of interstices between the cords, and utilizing a high twist of the latter, shearing stresses can now be tolerated in the bead region or area of the tire. Hence, a reduced ply gauge may be used in the bead area thus reducing heating during use and facilitating the aforementioned more uniform distribution of flexing resistance. Furthermore, the improved bonding of the rubber or other elastomers to the cords of the fabric employed in the chafing and/or flipper strips, as the result of the open weave, prevents the removal of the rubber or elastomers by scraping or abrasion between the rim flange and the tire during operation which has been a serious problem heretofore in tires having relatively rigid bead regions as the result of using closely woven or open weftless fabric in the chafing or finishing strips and/or flipper strips.

The fabric 18 may be prepared for incorporation into the pneumatic tire by dipping the latter into a suitable preparation which increases the adherence of the cords to the rubber or other elastomers. Such material may, for example, comprise the well-known dispersion of latex in resorcinol formaldehyde solution; a dispersion or solution of acid catalyzed resorcinol formaldehyde and butadiene vinyl pyridine copolymer coupled with a subsequent treatment in an aqueous dispersion of latex; a solution or dispersion of resorcinol formaldehyde with neoprene or with bromine containing isoolefin-polyolefin interpolymer; or other materials comprising polymerized molecules containing both polar groups and curing groups. That is, materials which provide both polar linkage between molecules by electrostatic attraction and curing linkage, at the double valence bonds, of the type commonly referred to as vulcanization. This treatment is preferably effected by dipping the fabric 18 in the solution and then allowing the latter to dry in the manner schematically indicated in Fig. 3. Thus, the fabric 18 may be led from a roll 21 thereof over direction-changing rollers, such as 22, and through a tank or vat 23 containing the treating solution. The fabric emerging from the tank or vat passes through a conventional drying apparatus 24 which may include a tentering frame or the like to prevent unequal shrinkage of the fabric as is wellknown in the art. After passing through the drying apparatus 24, the material is supplied with rubber or other elastomer by passing the same through a conventional calender 25, this operation preferably being performed in sequence immediately after the drying step. The fabric may then be directly used in a tire building operation or may be wound upon a roll 26 with a Holland cloth or the like 27 between layers of the fabric 18.

The use of various adhesives or treating substances, such as resorcinol formaldehyde in an aqueous latex dispersion or similar materials, has been employed heretofore for facilitating adhesion of rubber or the like to the fabric. However, in accordance with conventional procedures, this treatment is effected at a rate such that there is generally no appreciable penetration of the solution into or between the fibers and the coating produced thereon is only surface in nature. Consequently, the interstices between the fibers of the cords are not substantially filled so that air can permeate lengthwise of the cords, even though the latter be imbedded in a body of rubber. This is an objectionable feature especially in tires of the tubeless variety since the cords of the chafing or finishing strips formed of such fabric would act as small wicks or tubes for conducting air from the interior of the tire to the exterior thereof.

In accordance with this invention, this difficulty is obviated by employing as the fabric for the flippers and finishing or chafing strips, cords made from synthetic fibers of the continuous filament type so that no air can pass through the individual fibers themselves. Furthermore, the treatment of the cords with any of the aforementioned solutions is not simply a surface coating operation as heretofore practised. On the contrary, the fabric 18 is passed through the solution at a speed such that it can penetrate into the interstices between the fibers of the cords substantially filling the said interstices so that no air can diffuse or pass through the cords when the fabric has been dried and incorporated into a tire. Therefore, the treatment with the solution not only facilitates the union of the cords with the rubber on the tire, but also makes the fabric impervious to the passage of air and, hence, even if the ends of the cords in the finishing or chafing strips should be exposed during use of a tire embodying the same, no air can leak from the interior of the tire lengthwise of the cords, nor can moisture penetrate the cords and damage the tire.

In employing the improved fabric of this invention for the chafing or finishing strips and/or for the flipper strips, the fabric is so applied that the individual cords thereof form an angle with a radius of the tire, which angle is preferably in the order of 45°. Hence, the strength of the sidewalls is substantially the same in all directions. Where extra strength is desired, more than one chafing or finishing strip 17 formed of the fabric 18 may be employed with the several strips disposed so that the cords thereof angularly intersect each other in the manner which is well-known in the tire building art. It will be evident that the chafing or finishing strips 17 may either extend entirely around the bead region 13 or may only extend on the outer side of the sidewall of the tire and under the bead heel. These and other conventional procedures normally employed in the construction of tires may be utilized in tires incorporating the improved fabric without departing from the principles of this invention. Consequently, the invention is not to be considered as limited to the exact details and dimensions herein illustrated and described except as may be required by the spirit and scope of the appended claims.

Having thus described the invention, I claim:

1. In a pneumatic tire comprising a cord reinforced rubber carcass with spaced circumferentially extending bead portions, a rubber covered cord fabric finishing strip incorporated in and covering each of said bead portions, each of said strips being formed of a woven fabric having spaced warp and weft cords of continuous length synthetic filaments, the said cords having a twist in excess of six turns per inch and the interstices between the cords constituting in the order of 10% to 30% of the total area of the fabric.

2. In a pneumatic tire comprising a cord reinforced rubber carcass with spaced circumferentially extending bead portions, a finishing strip in each of said bead portions formed of a rubber covered woven fabric having spaced warp and weft cords intersecting at substantially right angles, the said cords each comprising a plurality of yarns of continuous length synthetic filaments having the yarns twisted together with the twist being in excess of six turns per inch, and the interstices between the cords constituting in the order of 10% to 30% of the total area of the fabric.

3. A pneumatic tire comprising a cord reinforced rubber carcass with spread circumferentially extending bead cores each covered by a flipper strip, the said strips each comprising a woven fabric formed by spaced warp and weft cords intersecting at substantially right angles, the said cords each comprising a plurality of yarns of continuous length synthetic filaments having the yarns twisted together with the twist being in excess of six turns per inch, and the interstices between the cords constituting in the order of 10% to 30% of the total area of the fabric.

4. A pneumatic tire comprising a cord reinforced rubber carcass with spaced circumferentially extending bead portions each containing a bead core covered by a flipper strip and with a rubber covered chafer strip on the outer surface of each of said bead portions, the said chafer and flipper strips each comprising a woven fabric formed by spaced warp and weft cords intersecting at substantially right angles, the said cords each comprising yarns of continuous length synthetic filaments having the yarns twisted together with the twist being in excess of six turns per inch, and the interstices between the cords constituting in the order of 10% to 30% of the total area of the fabric.

5. A tubeless pneumatic tire comprising a cord reinforced rubber carcass with spaced circumferentially extending bead portions each including a finishing strip, the said strip comprising a rubber covered woven fabric formed by spaced warp and weft cords of twisted continuous length synthetic filaments, the said cords each having a twist in excess of six turns per inch and the interstices between the cords constituting in the order of 10% to 30% of the total area of the fabric, and the longitudinally extending interstices between the individual filaments of the cords being sufficiently filled by a composition containing polymerized molecules having both groups which effect polar linkage between molecules by electrostatic attraction and groups which effect a curing linkage at double valence bonds of the molecules to prevent passage of air along or through the cords.

6. A tubeless pneumatic tire as defined in claim 5 wherein each bead portion has a core covered by a flipper strip formed of fabric identical in nature with that utilized for the said finishing strips.

References Cited in the file of this patent

UNITED STATES PATENTS

| | | |
|---|---|---|
| 1,560,700 | Langer | Nov. 10, 1925 |
| 2,131,636 | Nellen | Sept. 27, 1938 |
| 2,313,904 | Van Brederode | Mar. 16, 1943 |
| 2,449,180 | Schroeder | Sept. 14, 1948 |
| 2,592,844 | Antonson | Apr. 15, 1952 |
| 2,601,394 | Hansen | June 24, 1952 |
| 2,645,266 | Muller | July 14, 1953 |
| 2,884,181 | Riggs et al. | July 22, 1958 |

FOREIGN PATENTS

| | | |
|---|---|---|
| 595,290 | Great Britain | Dec. 1, 1947 |